United States Patent
Ohya et al.

(10) Patent No.: US 6,532,144 B2
(45) Date of Patent: Mar. 11, 2003

(54) ELECTRICAL DOUBLE LAYER CAPACITOR

(75) Inventors: Masako Ohya, Tokyo (JP); Susumu Saitou, Tokyo (JP)

(73) Assignee: NEC TOKIN Corporation (JP)

( * ) Notice: Subject to any disclaimer, the term of this patent is extended or adjusted under 35 U.S.C. 154(b) by 0 days.

(21) Appl. No.: 09/949,246

(22) Filed: Sep. 7, 2001

(65) Prior Publication Data

US 2002/0051335 A1 May 2, 2002

(30) Foreign Application Priority Data

Sep. 11, 2000 (JP) .................................... 2000-275470

(51) Int. Cl.[7] ............................................. H01G 9/004
(52) U.S. Cl. .................. 361/502; 361/503; 361/508; 361/511; 361/512; 29/25.03
(58) Field of Search .................. 361/502, 503, 361/504, 512, 511, 510, 521, 517, 519, 508, 509, 516, 518

(56) References Cited

U.S. PATENT DOCUMENTS

| | | | |
|---|---|---|---|
| 4,626,964 A | * | 12/1986 | Azuma et al. |
| 5,136,472 A | * | 8/1992 | Tsuchiya et al. |
| 5,369,546 A | * | 11/1994 | Saito et al. |
| 5,973,912 A | * | 10/1999 | Kibi et al. |
| 6,377,441 B1 | * | 4/2002 | Ohya et al. |
| 6,426,865 B2 | * | 7/2002 | Kasahara et al. |

FOREIGN PATENT DOCUMENTS

| | | | |
|---|---|---|---|
| JP | 61-117238 | 7/1986 | ............ H01G/9/00 |
| JP | 4-288361 | 10/1992 | ............ C08L/65/00 |
| JP | 5-46026 | 6/1993 | ............ H01G/9/00 |
| JP | 405182866 A | * 7/1993 | |
| JP | 8-78291 | 3/1996 | ........... H01G/9/016 |

* cited by examiner

Primary Examiner—Anthony Dinkins
Assistant Examiner—Nguyen T Ha
(74) Attorney, Agent, or Firm—Hayes Soloway PC

(57) ABSTRACT

In an electric double layer capacitor, at least three frame-shaped gaskets are stacked. A cell member of a pair of polarized electrodes sandwiching a porous separator is accommodated within a central gasket so as to be sandwiched between a pair of current collectors. Upper and lower frame shaped gaskets are adhered on both side edges of the central gasket such that the current collectors are sandwiched and held with two gaskets confronting to seal the inside of the central gasket. A step portion is formed in an inner peripheral end surface of at least one of the gaskets confronting such that each of the side edges of the collectors is received in this step portion, whereby making it easy to position the current collector in the gasket. This step portion also makes it possible to bond the current collector to the gasket at a low stress. All surfaces of the side edges of the current collectors are contacted with the gaskets to improve the reliability of the electric double layer capacitor by preventing leaking of the electrolytic solution from the capacitor cell under the high temperature environment.

10 Claims, 8 Drawing Sheets

ELECTRICAL DOUBLE LAYER CAPACITOR

BACKGROUND OF THE INVENTION

1. Field of the Invention

The present invention relates to an electrical double layer capacitor, and more particularly to a large-capacitance electrical double layer capacitor using a solid polarized electrode.

2. Description of the Prior Art

An electrical double layer capacitor in a conventional example 1 will be described with reference to FIGS. 1 to 3.

Referring to FIG. 1, a cell laminate 171 of the electrical double layer capacitor has the structure of laminating two cells. Each cell 161 comprises a gasket 151 of a frame shape, a couple of polarized electrodes 110 deposited within the gasket 151, a separator sandwiched between the polarized electrodes 110 and a current collectors 121 adhered to the upper surface of the gasket 151. An electrolytic solution 130 is sealed in the cell 161. The polarized electrodes 110 contact with the current collectors 121. The upper and the lower surfaces of the gasket 151 are flat as shown in FIG. 2.

The polarized electrodes 110 are made of solid activated carbon mainly containing activated carbon/polyacene material or the like as disclosed in Japanese Patent Application Laid-open No. Hei 4-288361. The current collector 121 is made of rubber or plastic, which contains electrically conductive carbon.

Because a withstand voltage of the electrical double layer capacitor is limited by the electrolysis voltage of the electrolytic solution 130, cells 161 are connected in series in accordance with a required withstand voltage. Also, as shown in FIG. 3, both sides of the cell laminate 171 are sandwiched between pressure plates 190 to apply a pressure between the cells and between terminal electrodes 180, thereby lessening a contact resistance between the current collector 121 and the polarized electrode 110.

In recent years, the electrical double layer capacitor thus structured is made large in capacitance by using an improved polarized electrode, and new usage of the electrical double layer capacitor is found by lessening an equivalent series resistance (hereinafter referred to as "ESR"). As its examples, there are a usage of a power supply for driving a starter motor in an automobile in combination with a lead-acid battery, and an intended use of an auxiliary power supply in combination with a solar battery.

In the case where the electrical double layer capacitor is used for those intended uses, there is a high possibility that the electrical double layer capacitor is located under a high temperature environment, and the high reliability of the electrical double layer capacitor is required under such an environment. However, the above-described electrical double layer capacitor in the conventional example 1 has the following problems.

(1) In the cell laminate 171, the electrolytic solution 130 within the cell 161 is sealed with the adhesion of the gaskets 151 and the current collectors 121 which are different in material from each other. At a high temperature, the electrolytic solution 130 is thermally expanded. Also, a gas is produced within the cell by the application of a large voltage or a high temperature. As shown in FIG. 1, the outer peripheral end surfaces of the current collectors 121 are exposed to the side surfaces of the cell laminate 171. Because of this structure, there occurs a gap between the gaskets 151 and the current collectors 121 due to their separation caused by the thermal expansion of the electrolytic solution and the occurrence of a gas within the cell, thereby being liable to leak the electrolytic solution 130 within the cell to the exterior from that gap.

(2) In order to improve the electric contact of the polarized electrodes 110 and the current collectors 121, the cell laminate 171 is so structured as to be pressurized from the outside at the outermost current collector 121 and nipped by high rigid metal plates which are hardly deformable (refer to the pressure plates 190 in FIG. 3). Also, among the structural materials of the electrical double layer capacitor, there are many cases in which the polarized electrodes 110 are formed of hard and rigid members such as a sintered body of the activated carbon, and the gaskets 151 are made of a hard material such as ABS resin in order to enhance a precision in the dimensions of a product. Because the current collectors 121 are made of an electrically conductive rubber, which is thin and elastic, a positional displacement occurs when pressurizing the current collectors 121. As a result, a strong force is locally exerted on the current collectors 121, and a crack is liable to occur in the current collectors 121.

A technique by which the above problems are solved is disclosed in Japanese Patent Application laid-open No. Hei 8-78291 (a conventional example 2), Japanese Utility Model laid-open No. Sho 61-117238 (a conventional example 3) and Japanese Patent Application Laid-open No. Hei 5-46026 (a conventional example 4).

In the electrical double layer capacitor of the conventional example 2, as shown in FIG. 4, the outer diameter of a current collector 122 within a cell 162 of a cell laminate 172 is smaller than the outer diameter of the current collector 121 at the outermost side. That is, the electrical double layer capacitor is structured such that the outer diameter of the current collector 122 within the cell is set to have an intermediate value between the inner diameter and the outer diameter of a gasket 152, and the peripheral edge portion of the current collector 122 is received in a recess 153 of the inner peripheral surface of the gasket 152, as shown in FIG. 5.

In the electrical double layer capacitor of the conventional example 3, as shown in FIG. 6, step portions are formed on inner peripheral portions of both end surfaces of gasket 154, as shown in FIG. 6, a current collector 123 is received in these step portions 58, and a cell is composed in the electric double layer capacitor. Two or more cells are stacked and a cell laminate is formed in the conventional example 3.

Also, in the electrical double layer capacitor of the conventional example 4, as shown in FIG. 7, a concave is formed over each of the frame entire periphery on both of the upper and lower surfaces of gaskets 155 of a cell 163 of a cell laminate 173. A projection is formed on a current collector 124 corresponding to the concave, and the projection engages with the concave. FIG. 8 is a schematic view of the gasket 155. A concave 156 is formed over the frame entire periphery on both of the upper and lower surfaces of gasket 155.

In the electrical double layer capacitor of the conventional example 2 to the conventional example 4, there prevents the leakage of the electrolytic solution due to a crack or separation by enhancing the seal strength between the respective cells.

However, the capacitors of the conventional example 2 to the conventional example 4 suffer from the following problem in that it is difficult to improve the productivity and to ensure the reliability.

After the side edge portion of collector 122 in the cell is inserted in the concave portion of gasket 152, gasket 152 is compressed in manufacturing the electric double layer capacitor of the conventional example 2. As a result, the bonding strength of collector 122 and gasket 152 is improved, and the sealing reliability in the electric double layer capacitor of the conventional example 2 is improved, compared with that in the above-mentioned capacitor of the conventional example 1.

However, both the upper and lower end surfaces of the gasket 152 are flat as shown in FIG. 5 and a portion of concave portion 153 of the gasket 152 in which the side edge portion of the current collector 122 is received is thick because the thickness of the current collector 122 exists, and a portion of the concave portion 153 into which the current collector 122 is not inserted is thin. Since a distortion occurs on a boundary with different thickness, the current collector 122 and the gasket 152 are liable to be separated from each other and leak solution, thereby not being capable of ensuring reliability.

Also, in the capacitor of the conventional example 2, the current collector 121 at the outermost side has a structure of sealing the gas with the gasket 152 and the current collector 121 which are different in material from each other, and the sealing structure is identical with that of the capacitor in the conventional example 1 of FIG. 1, and therefore, a pressure load is liable to be more applied to the current collector 121 toward the outermost side under a high temperature environment, as a result t that the solution is liable to be leaked due to a separation between the gasket 152 and the current collector 121. In addition, there is the high possibility that a positional displacement may occur in assembling the current collectors 122 within the cell. The positional displacement leads to the non-uniform pressure resulting in cases where ESR of the cell laminate rises and the solution is leaked from the cell laminate. Thus, there arises such a problem as the decrease of the yield of the capacitor, that is, the decrease in productivity.

In the electrical double layer capacitor of the conventional example 3, the current collectors 123 are received in the step portions 58 formed on inner peripheral portion of both end surface of gasket to result in the improvement of bonding strength of the current collector to the gasket, compared with that in the conventional example 2. However, the current collector the outside of the cell laminate might flake off from the gasket and the electrolytic solution 130 leak outside the capacitor under the environment of the high temperature. Moreover, there as a problem in the capacitor of the conventional example 3 that the electric contact reliabilities between cells of the cell laminate decreased under the high temperature so far.

Then, let us consider the electrical double layer capacitor of the conventional example 4. In this capacitor, the insertion of the projection of the current collector 124 into the concave 156 of the gasket 155 makes it difficult to produce the positional displacement of the current collector 124 when a pressure is applied from the current collector of the outermost layer of the cell laminate. However, when the thickness of the projection of the current collector 124 becomes larger than the depth of the concave of the gasket 155, a crinkling occurs in the gasket 155 at a portion where the projection of the current collector 124 and the concave of the gasket 155 are engaged with each other. The crinkling makes a gap occur between the current collector and the gasket, to thereby make it easy to separate the current collector and the gasket from each other.

Furthermore, because the capacitor of the conventional example 4 is structured such that the outer diameters of the current collector 124 and the gasket 155 are identical with each other as in the structure of the capacitor in the conventional example 1, and the gasket 155 and the current collector 124 which are different in material from each other are bonded together, a separation is liable to occur between the gasket 155 and the current collector 124 due to the thermal stress or the like.

SUMMARY OF THE INVENTION

The present invention has been made under the above circumstances, and therefore an object of the present invention is to provide an electrical double layer capacitor, which is capable of improving the productivity.

Another object of the present invention is to provide an electrical double layer capacitor that improves the reliability even under a high temperature environment.

To achieve the above objects, according to the present invention, there is provided an electrical double layer capacitor as follows.

A cell member of a couple of polarized electrodes sandwiching a porous separator is accommodated within a first gasket of a frame shape and current collectors, a first current collector and a second current collector are adhered on an upper end side and a lower end side of this gasket, respectively.

In addition, additional frame gaskets, a second gasket and a third gasket are adhered on the upper end side and the lower end side of the first gasket to sandwich the first current collector and the second current collector with the first gasket, respectively, sealing the inside of the first gasket.

And the electric double layer capacitor of the present invention has a structure that a step portion is formed in an inner peripheral end surface of at least one of the gaskets confronting and the side edge of each collector is accommodated by this step portion. The positioning of the current collector in the gasket may become easy and bonding of the current collector to the gasket as a low stress by this step portion achieved.

In addition, the electric double layer capacitor of the present invention has a structure that all surfaces of the side edge of each current collector are contacted with the gaskets confronting, which improves the reliability of the electric double layer capacitor by preventing the leaking of the electrolytic solution from the capacitor cell under the high temperature environment.

Especially, an electric double layer capacitor of high reliability under the high temperature environment may be obtained by adjusting the ratio to the thickness of the current collector of the depth of the step portion to 0.1~3.0 in the electric double layer capacitor of the present invention.

BRIEF DESCRIPTION OF THE DRAWINGS

These and other objects and advantages of the present invention will become more fully apparent from the following detailed description taken with the accompanying drawings in which.

DETAILED DESCRIPTION OF THE PREFERRED EMBODIMENTS

An electrical double layer capacitor according to a first embodiment of the present invention will be described with reference to FIG. 9.

Figure 9:
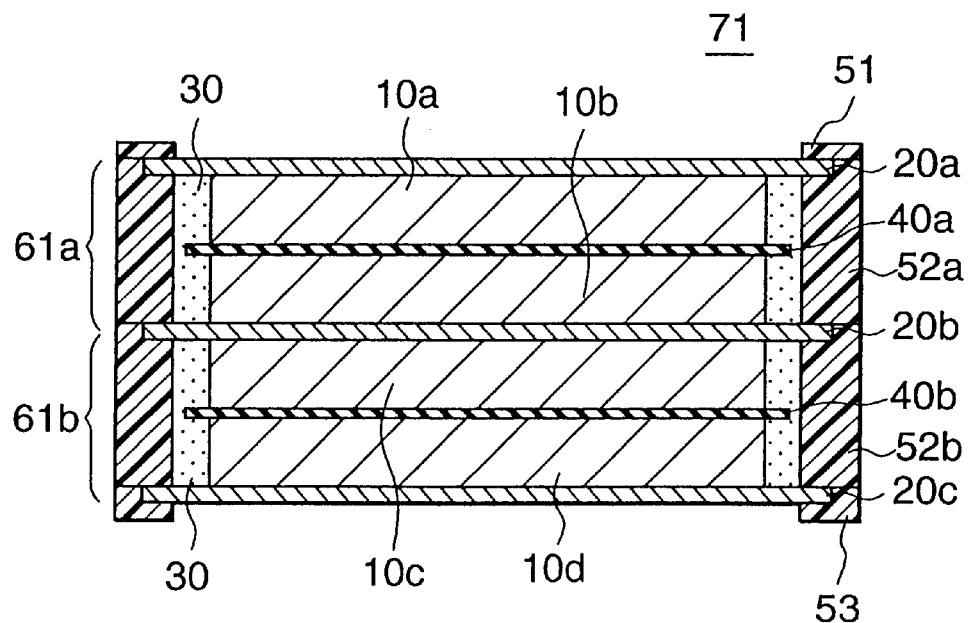
FIG. 9 is a cross-sectional view showing a cell laminate in an electrical double layer capacitor in accordance with a first embodiment of the present invention.

Referring to FIG. 9, a cell laminate 71 of the electrical double layer capacitor in accordance with the present invention has a structure in which cells 61a and 61b are vertically laminated. The cell 61a includes a porous separator 40a, a polarized electrode 10a and a polarized electrode 10b, which are disposed in contact with an upper surface and a lower surface of the separator 40a, respectively, and a current collector 20a and a current collector 20b, which are disposed in contact with outer surfaces of those polarized electrodes 10a and 10b, respectively. Also, the cell 61b includes a porous separator 40b, a polarized electrode 10c and a polarized electrode 10d which are disposed in contact with an upper surface and a lower surface of the porous separator 40b, respectively, and a current collector 20b and a current collector 20c which are disposed in contact with outer surfaces of those polarized electrodes 10c and 10d, respectively. The current collector 20b serves as the current collector of the cells 61a and 61b.

Figure 10:
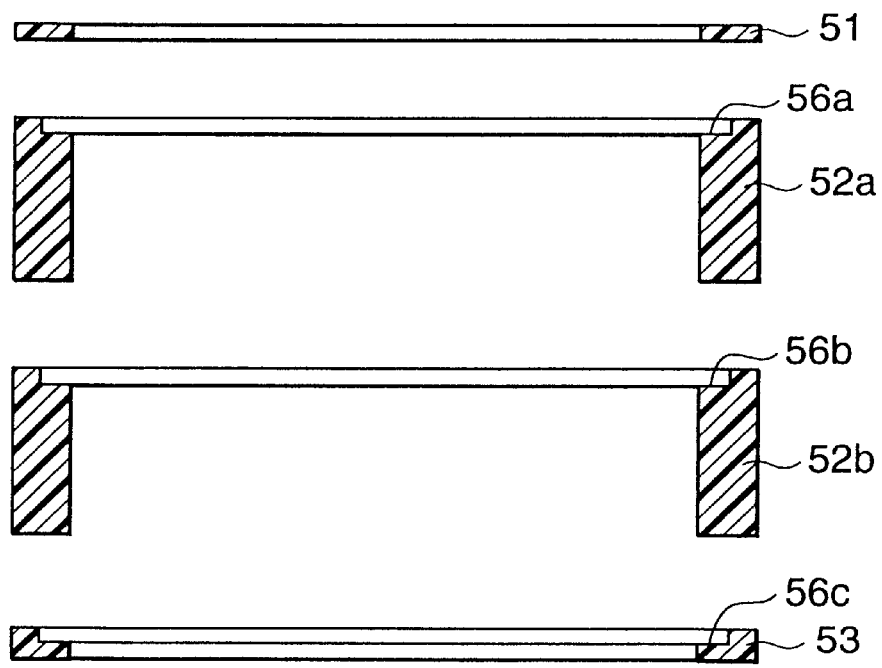
FIG. 10 is a cross-sectional view showing a gasket in an electrical double layer capacitor in accordance with the first embodiment of the present invention.

The cell 61a includes a first gasket 52a which is disposed around the current collector 20a, the separator 40a, the polarized electrode 10a and the polarized electrode 10b, and has a step portion 56a that receives the side edge portion of the current collector 20a in an inner peripheral edge portion of an upper end surface as shown in FIG. 10, and a second gasket 51 which has the same outer peripheral dimensions as those of the first gasket 52a and is adhered to the upper end surface of the first gasket 52a and the peripheral portion surface of the current collector 20a. An electrolytic solution 30 is received in the interior of the cell 61a and sealed with the first gasket 52a and the current collectors 20a and 20b.

Likewise, the cell 61b includes a third gasket 52b which is disposed around the current collector 20b, the separator 40b, the polarized electrode 10c and the polarized electrode 10d, and has a step portion 56b that receives the side edge portion of the current collector 20b in an upper end surface inner peripheral edge portion as shown in FIG. 10, and a fourth gasket 53 having a step portion 56c that receives the side edge portion of the current collector 20c in an upper end surface inner peripheral edge portion, which is disposed in contact with the lower end surface of the third gasket 52b and the peripheral portion surface of the current collector 20c. The first gasket 52a and the third gasket 52b are identical in structure with each other.

An electrolytic solution 30 is 61b and sealed with the third gasket 52b and the current collectors 20b and 20c.

It is preferable that the depth of the respective step portions 56a~56c is set to be the same as the thickness of the current collectors 20a and 20b. The upper and lower end surface of the second gasket 51 is flat.

It is preferable that the polarized electrodes 10a to 10d have the same thickness. Those polarized electrodes are made of block-shaped activated carbon obtained by mixing activated carbon powders with a binder material such as phenol resin and then sintering the mixture. Neither the binder material nor the manufacturing method of the polarized electrode is limited in the above-stated examples.

The current collectors 20a to 20c are formed of a butyl rubber sheet or a polyethylene sheet in which an electrically conductive material such as carbon powders is kneaded.

The separator 40 is formed of a porous member, and its material is not limited if the material is an electrically non-conductive and ion transmission film. For example, the separator 40 may be a glass fiber separator, or the like.

Gaskets 51, 52a, 52b and 53 are frame-shaped members, and their shape is generally rectangular or cylindrical. Gaskets 51, 52a, 52b and 53 are used for receiving and sealing the polarized electrodes 10a to 10c, the separators 40a and 40b and the electrolytic solution 30 such as dilute sulfuric acid in association with the current collectors 20a to 20c. The material of the gaskets may be an insulator such as rubber or plastic, for example, butyl rubber, polyethylene resin, ABS resin or the like.

As above-described, the cell of the electric double layer capacitor according to the present invention comprises a frame gasket, a pair of polarized electrodes separated by a porous separator set up within a frame gasket, and collectors which adhere to the side ends of the gasket and seal the frame gasket. And, the step portion for receiving the current collector is disposed on the inner peripheral edge portion of the gasket, thereby being capable of making the arrangement of the current collector in the gasket easy, and conducting the adhesion of the current collector and the gasket at a low stress easily in the electrical double layer capacitor according to the present invention. In addition, the surfaces of the peripheral edge portion of collectors are surrounded and bonded with a gasket, thereby preventing the electrolyte solution from leaking due to the decrease in bonding strength of the collector under the high temperature environment.

Then, a method of manufacturing the electrical double layer capacitor according to this embodiment will be described with reference to FIGS. 9 and 10. First, the side edge of the current collector 20c is integrated into the step portion 56c of the fourth gasket 53, and the third gasket 52b having the step portion 56b on the upper end portion inner side is adhered to the current collector 20c.

Then, the separator 40b is interposed between the polarized electrode 10d and the polarized electrode 10c, and those members are received within a frame of the third gasket 52b. Then, after the electrolytic solution 30, which is, for example, 30-wt % of dilute sulfuric acid, has been injected into the third gasket 52b that receives the polarized electrodes 10c and 10d and the separator 40b, the current collector 20b is integrated into the step portion 56b of the third gasket 52b.

Then, the first gasket 52a having the step portion 56a on the inner peripheral portion of the upper end portion is adhered to the current collector 26b, and the separator 40a is interposed between the polarized electrode 10b and the polarized electrode 10a, and those members are received within a frame of the first gasket 52a. Then, after the electrolytic solution 30 has been injected into the gasket 52a that receives the polarized electrodes 10a, 10b and the separator 40a, the side edge of the current collector 20a is integrated into the step portion 56 of the first gasket 52a. When the cells are further laminated, the above processes of adhering the gasket to integrating the current collector are repeated.

Then, the second gasket 51 having upper and lower flat surfaces is adhered to the first gasket 52a and the current collector 20a, thereby being capable of obtaining the cell laminate 71 of the electrical double layer capacitor. An insulating resin of epoxy resin may be coated on the outside surroundings side on bonding of the first gasket 52a and the third gasket 52b, thereby being capable of reinforcing sealing between the cells 61 and 62. The insulating resin of epoxy resin may be a thermosetting resin or an ultraviolet ray setting resin.

Figure 11:
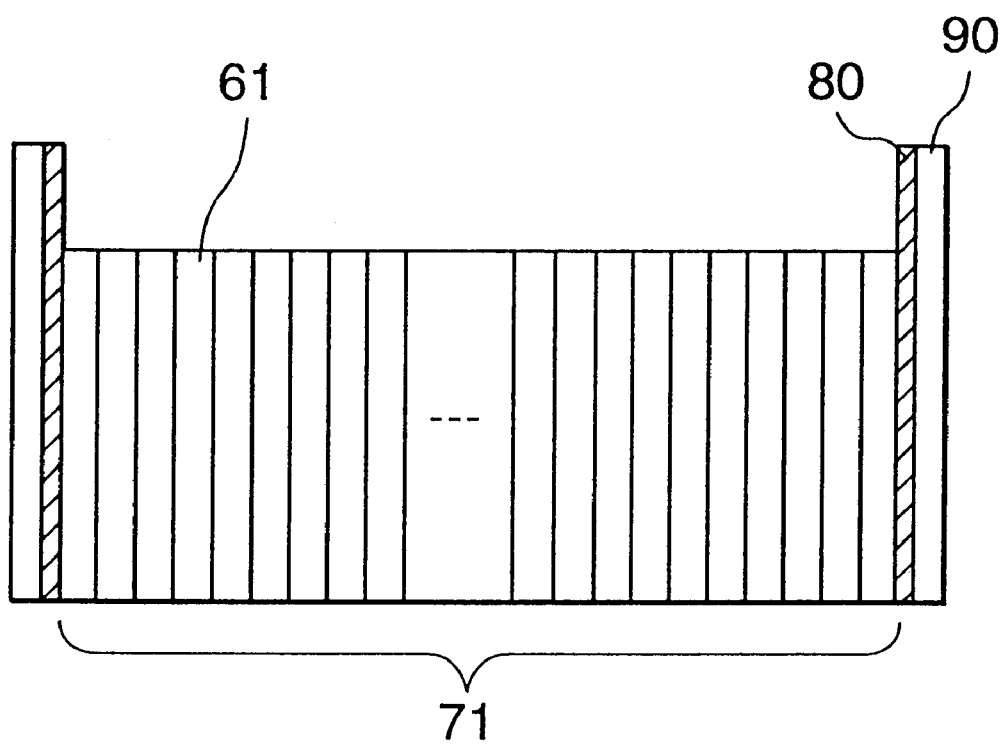
FIG. 11 is a side view showing the electrical double layer capacitor in accordance with the first embodiment of the present invention.

Then, as shown in FIG. 11, a terminal electrode 80 is interposed between pressure plates 90 disposed on the surfaces of the current collectors 20a and 20c at both sides of the outermost contour of the cell laminate 71, and the pressure plates 90 at both sides are pressed by a bolt and nut (not shown), etc., thereby being capable of completing an electrical double layer capacitor.

The dimensional example of a sample (Embodiment 1) of the electrical double layer capacitor thus completed is shown in Table 1. As shown in Table 1, there is a difference of 0.1 mm between the outer peripheral thickness and the inner peripheral thickness of gaskets 52a, 52b and 53. The difference represents a depth (A) of the step portions 56a, 56b, 56c and has the same dimension as that of the thickness (t) of the current collectors 20a, 20b, 20c. The step portions 56a, 56b, 56c are 83 mm in length (L) and 63 mm in width (W). A preferable value of the ratio (A/t) of the depth (A) of the step portions 56a, 56b, 56c to the thickness (t) of the current collector is larger than 0.1 but smaller than 3. A more preferable value ranges from 0.2 to 2.5. This reason will be described later. In the sample of Table 1, the value of A/t is set to 1. In this embodiment, 18 cells are laminated in series to manufacture the cell laminate having a withstand voltage of 15 V.

TABLE 1

| COMPONENT | LENGTH (L) | WIDTH (W) | UNIT: mm THICKNESS (t) |
|---|---|---|---|
| POLARIZABLE ELECTRODE (10a~10d) | 70 | 50 | 5 |
| SEPARATOR (40a, 40b) | 72 | 52 | 0.2 |
| CURRENT COLLECTOR (20a~20c) | 82 | 62 | 0.1 |
| GASKET (51) | | | |
| OUTER PERIPHERY | 84 | 64 | 1.0 |
| INNER PERIPHERY | 74 | 54 | 1.0 |
| GASKET (52a, 52b) | | | |
| OUTER PERIPHERY | 84 | 64 | 10.3 |
| INNER PERIPHERY | 74 | 54 | 10.2 |
| GASKET (53) | | | |
| OUTER PERIPHERY | 84 | 64 | 1.1 |
| INNER PERIPHERY | 74 | 54 | 1.0 |

The polarized electrodes 10a to 10d are produced by mixing the same phenol activated carbon powder with phenol resin powder at a ratio of 70/30-wt % and grinding, granulating and sintering the mixture.

Then, an electrical double layer capacitor according to a second embodiment of the present invention will be described with reference to FIGS. 12 and 13.

Figure 12:
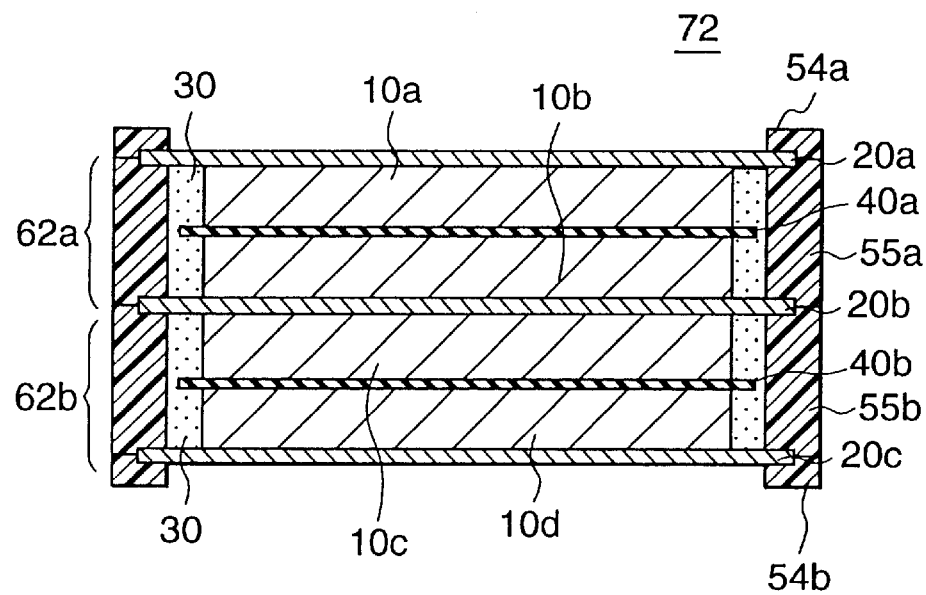
FIG. 12 is a cross-sectional view showing a cell laminate in an electrical double layer capacitor in accordance with a second embodiment of the present invention.
Figure 13:
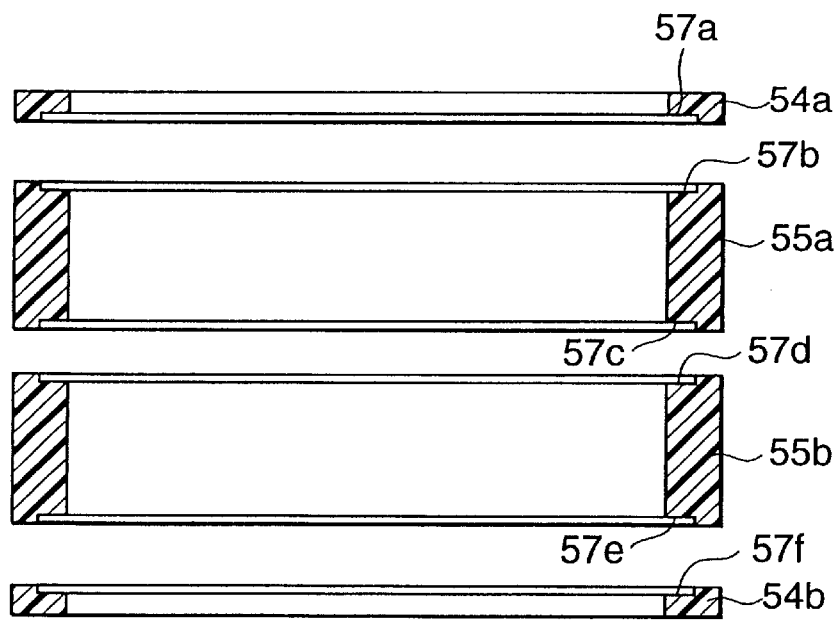
FIG. 13 is a cross-sectional view showing a gasket in an electrical double layer capacitor in accordance with the second embodiment of the present invention.

Referring to FIG. 12, it is found that the step portions that receive the current collector are disposed on both end portions of the gaskets of the cell. The capacitor in this embodiment is different from that in the above described first embodiment of the present invention in this regard. Referring to a schematic view of the gaskets shown in FIG. 13, in the electrical double layer capacitor according to this embodiment, step portions 57b, 57c that receive the side edge of the current collectors are disposed on the inner sides of both the upper and lower end portions of the first and third gaskets 55a and 55b. Also, a surface of the second and fourth gaskets 54a and 54b at the outermost contour of the cell laminate 72, which is in contact with the current collector is provided with step portions 57a and 57f that receive the side edge of the current collector. The depth of the step portions 57a~57f is about half of the thickness of the side edge portion of the current collector. The respective current collectors are received in concaves formed by the step portions 57a 57f of the gaskets adhered vertically. By these step portions disposed on the inner peripheral edge portion of the gaskets, the current collector may be guided in the gasket easily and also may be done the bonding of the current collectors and the gaskets at a low stress in the electrical double layer capacitor according to the present invention.

The conditions and method for manufacturing the electrical double layer capacitor according to this embodiment is identical with the above-described first embodiment. The dimensional example of the sample (Embodiment 2) of the electrical double layer capacitor thus completed is shown in Table 2.

The dimensions of the step portions 57a~57f of the gaskets 54a, 54b, 55a and 55b that receive the side edges of the current collectors are 83 mm in length (L), 63 mm in width (L) and 0.05 mm in depth (B). In Table 2, the ratio of the total (corresponding to 2×B) of the depths of the step portions of the laminate surfaces of the gaskets laminated vertically to the respective thickness (t) of the current collectors 20a, 20b and 20c is set to 1, but a preferable value of that ratio is larger than 0.1 but smaller than 3. A more preferable value ranges from 0.2 to 2.5. The reason for this will be described later.

TABLE 2

| COMPONENT | LENGTH (L) | WIDTH (W) | UNIT: mm THICKNESS (t) |
|---|---|---|---|
| POLARIZABLE ELECTRODE (10a~10d) | 70 | 50 | 5 |
| SEPARATOR (40a, 40b) | 72 | 52 | 0.2 |
| CURRENT COLLECTOR (20a~20c) | 82 | 62 | 0.1 |
| GASKET (54) | | | |
| OUTER PERIPHERY | 84 | 64 | 1.1 |
| INNER PERIPHERY | 74 | 54 | 1.0 |
| GASKET (55a, 55b) | | | |
| OUTER PERIPHERY | 84 | 64 | 10.3 |
| INNER PERIPHERY | 74 | 54 | 10.2 |

Then, comparative examples (prior art) of the above embodiments 1 and 2 according to the present invention will be described.

COMPARATIVE EXAMPLE 1

Figure 1:
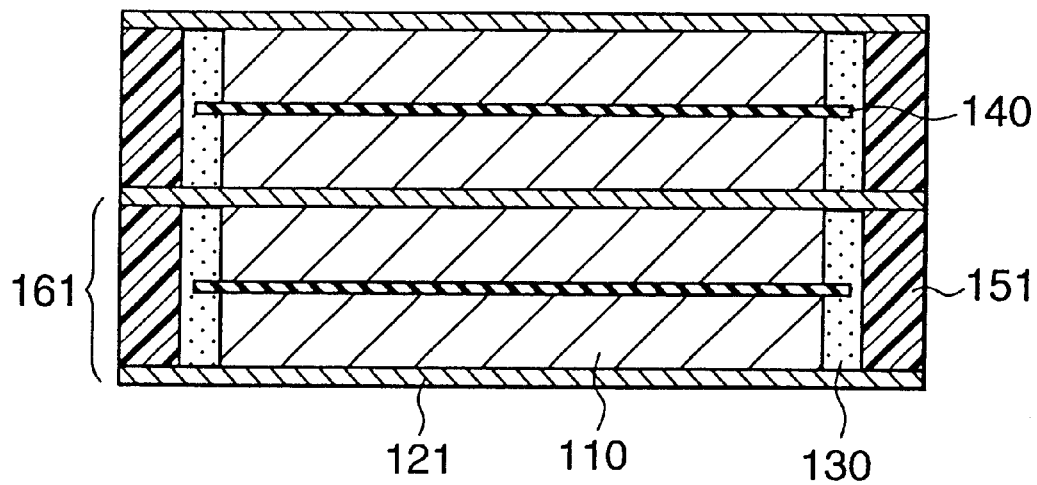
FIG. 1 is a cross-sectional view showing a cell laminate in an electrical double layer capacitor of a conventional example 1.
Figure 2:
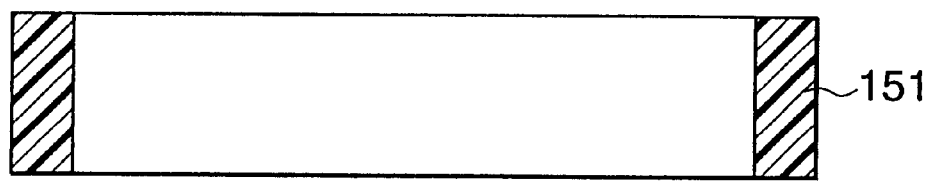
FIG. 2 is a cross-sectional view showing a gasket in the electrical double layer capacitor of the conventional example 1.
Figure 3:
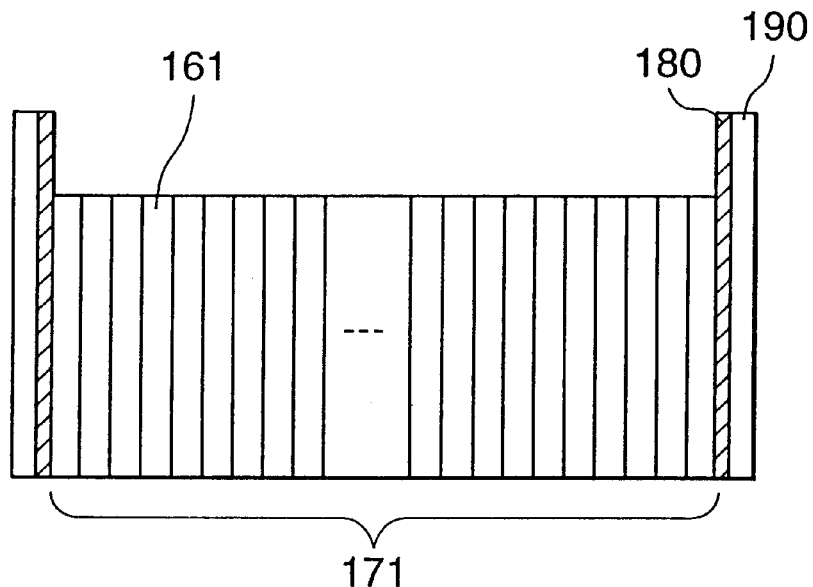
FIG. 3 is a side view showing the electrical double layer capacitor of the conventional example 1.

As a comparative example 1, an electrical double layer capacitor having the same cross-sectional structure as that of the cell laminate shown in FIG. 1 has been manufactured. The conditions and method of manufacturing the electrical double layer capacitor are substantially identical with those in the above-described embodiments of the present invention.

The dimensional example of the sample of the electrical double layer capacitor in the comparative example thus completed is shown in Table 3. The materials of the electrolytic solution 130 and other members are substantially identical with those in the above-described embodiments of the present invention.

COMPARATIVE EXAMPLE 2

Figure 4:
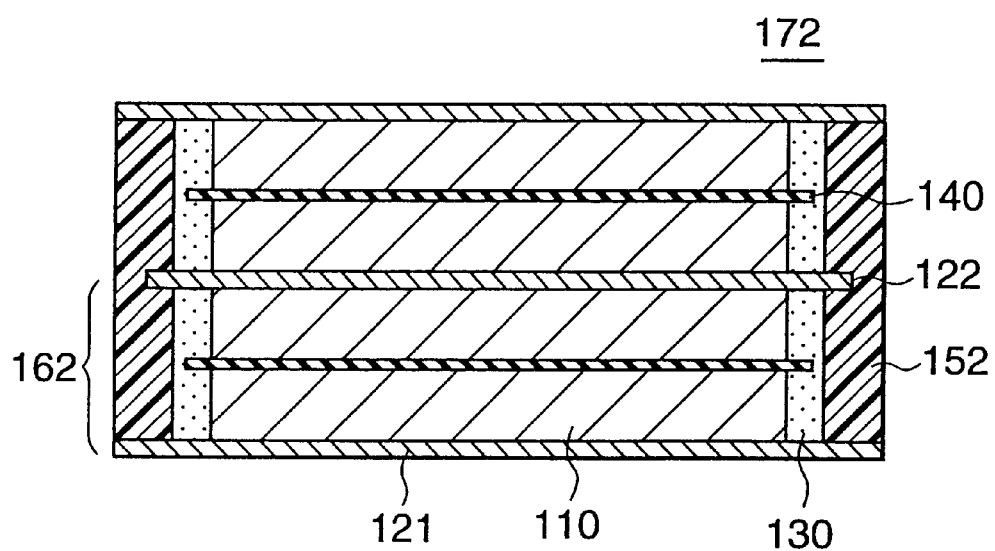
FIG. 4 is a cross-sectional view showing a cell laminate in an electrical double layer capacitor of a conventional example 2.
Figure 5:
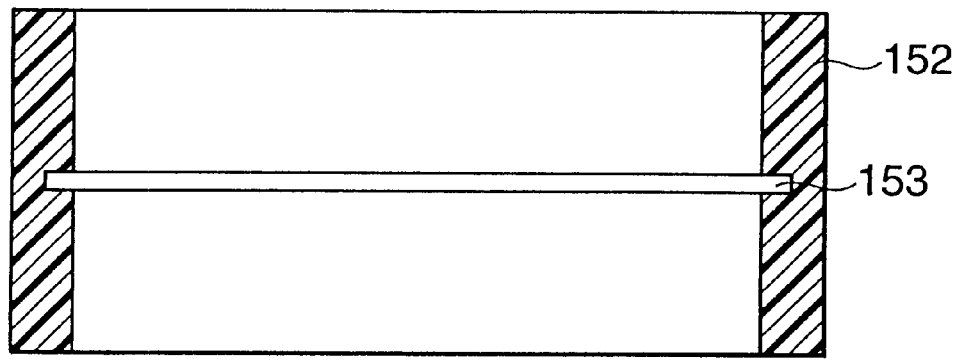
FIG. 5 is a cross-sectional view showing a gasket in the electrical double layer capacitor of the conventional example 2.
Figure 6:
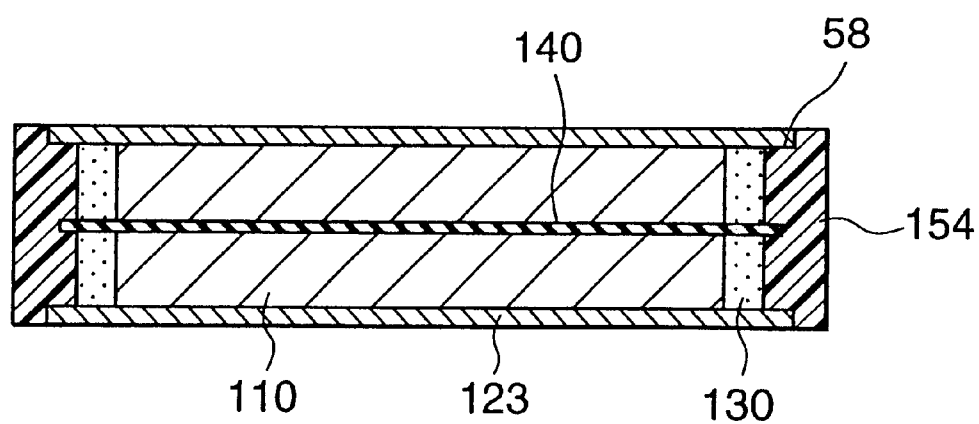
FIG. 6 is a cross-sectional view showing a cell in an electrical double layer capacitor of a conventional example 3.

As a comparative example 2, an electrical double layer capacitor having the same cross-sectional structure as that of the cell laminate shown in FIG. 4 has bee manufactured. The conditions and method of manufacturing the electrical double layer capacitor are substantially identical with those in the above-described embodiments of the present invention.

The materials of the electrolytic solution 130 and other members are substantially identical with those in the above-described embodiments of the present invention.

The size of the current collector 122 within the cell is set to 82 mm in length (L), 62 mm in width (W) and 0.1 mm in thickness (t). The sizes of other components are identical with those in the comparative example 1.

TABLE 3

| COMPONENT | LENGTH (L) | WIDTH (W) | UNIT: mm THICKNESS (t) |
|---|---|---|---|
| POLARIZABLE ELECTRODE (110) | 70 | 50 | 5 |
| SEPARATOR (140) | 72 | 52 | 0.2 |

TABLE 3-continued

| COMPONENT | LENGTH (L) | WIDTH (W) | UNIT: mm THICKNESS (t) |
|---|---|---|---|
| CURRENT COLLECTOR (121) | 84 | 64 | 0.1 |
| GASKET (151) | | | |
| OUTER PERIPHERY | 84 | 64 | 10.2 |
| INNER PERIPHERY | 74 | 54 | 10.2 |

COMPARATIVE EXAMPLE 3

Figure 7:
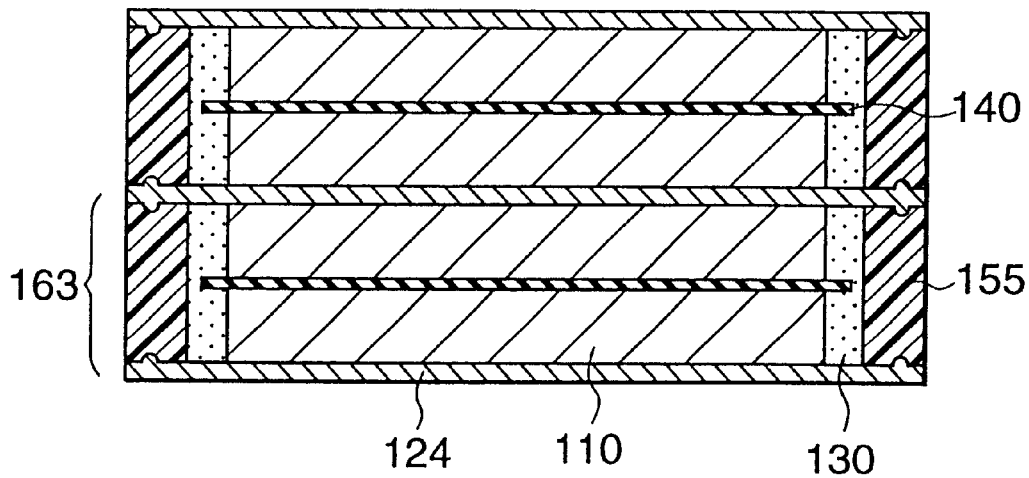
FIG. 7 is a cross-sectional view showing a cell laminate in an electrical double layer capacitor of a conventional example 4.
Figure 8:
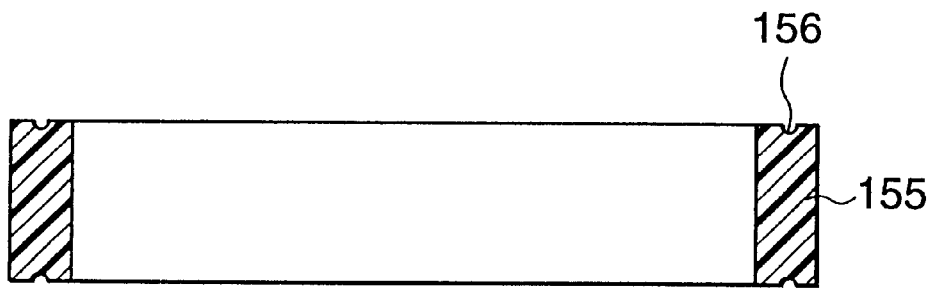
FIG. 8 is a cross-sectional view showing a gasket in the electrical double layer capacitor of the conventional example 4.

As a comparative example 3, an electrical double layer capacitor having the same cross-sectional structure as that of the cell laminate shown in FIG. 7 has been manufactured. The conditions and method of manufacturing the electrical double layer capacitor are substantially identical with those in the above-described embodiments of the present invention.

The materials of the electrolytic solution 130 and other members are substantially identical with those in the above-described embodiments of the present invention. The depth of the recess 156 of the gasket 155 is set to be 1 mm.

Then, the results of measuring the defect occurrence ratio at the time of production and the relative mean lifetime in the reliability test with respect to the electrical double layer capacitors of the embodiments 1 and 2 and the comparative examples 1 to 3 will be described.

The relative mean lifetime in the reliability test is obtained in such a manner that the time elapsed until defects occur in a sample (leakage of the electrolytic solution to the external) is obtained for each of the samples in a state where d.c. 15 V is applied at 70° C., and the obtained results are plotted on a Weibull chart, and the mean lifetimes (MTTF) of the respective levels are obtained from that result. The mean lifetimes of the respective samples are normalized with the mean lifetime of the comparative example 1 being 1. The number of samples is set to 30 in the respective levels, and their mean is obtained. The result is shown in Table 4.

Figure 14:
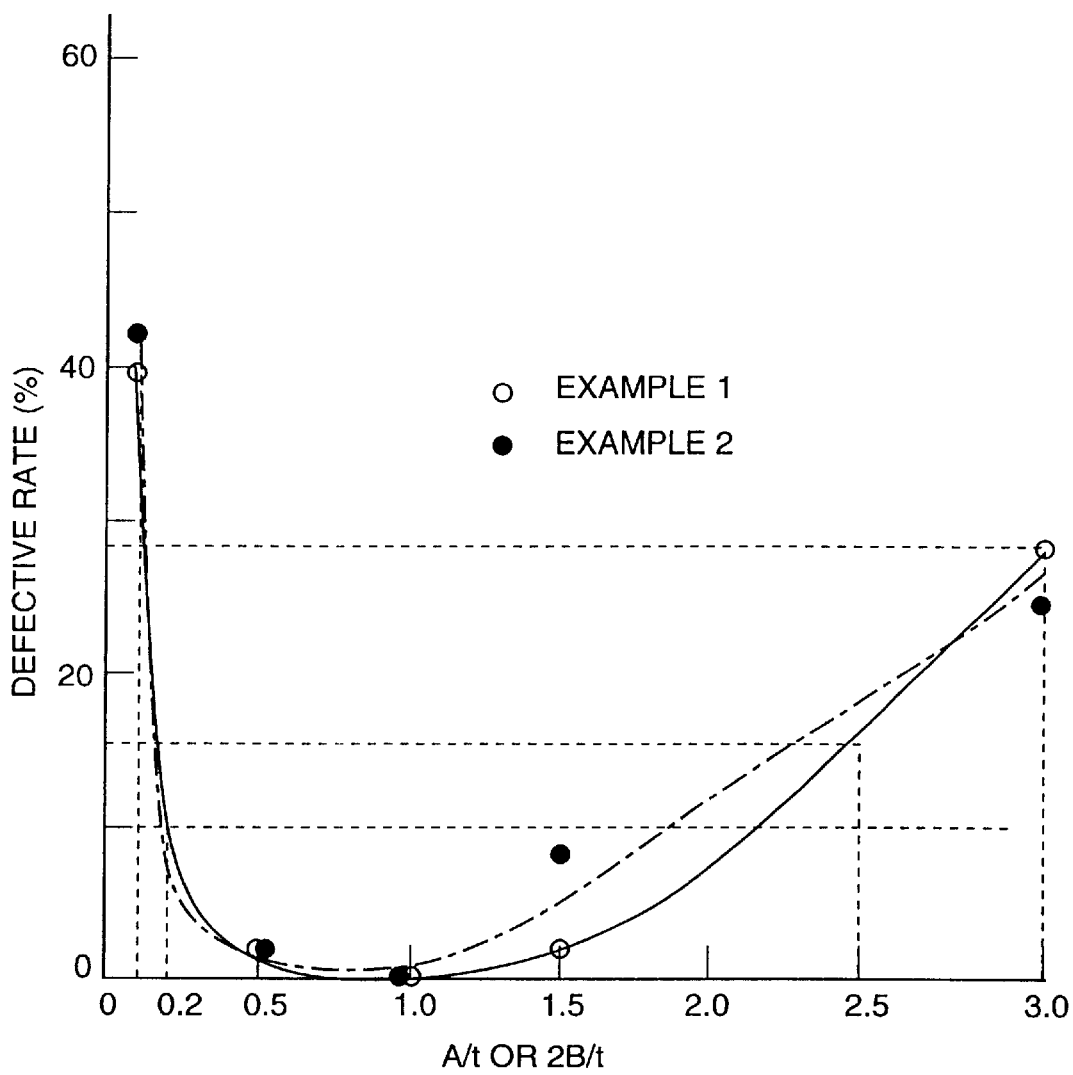
FIG. 14 is a graph that plots a relationship of the depth of a step portion, the thickness of the current collector and the defective rate in an embodiment 1 and an embodiment 2 shown in Table 1.

In Table 4, the A/t value of the embodiment 1 is the ratio of the depth of the step portion of the gasket to the thickness of the current collector, and the 2B/t value of the embodiment 2 is the ratio of the total of the upper and lower step portions of the laminated gaskets to the thickness of the current collectors. FIG. 14 is a graph that plots the ratio (A/t and 2B/t) of the depth of the step portion of the gasket to the current collector in the embodiments 1 and 2 of the present invention shown in Table 4 on the axis of abscissa and the defective rate on the axis of ordinate.

Referring to Table 4, as compared with the comparative example 1, the capacitors of the comparative examples 2 and 3 have the process defective rates of 21% and 29%, respectively, which are lower than that of the comparative example 1 by 30% and 22%, respectively. Similarly, the relative mean lifetimes are extended by 2.4 times and 2.8 times, respectively.

On the contrary, in the embodiment 1 of the present invention, with the A/t value is from 0.5 to 1.5, the process defective rate is 0 to 2%, and the relative mean lifetime is 10 times or longer, which are greatly improved as compared with not only the comparative example 1 but even the comparative examples 2 and 3. Also, the process defective rate and the relative mean lifetime in the embodiment 2 of the present invention are greatly improved with the limits that the 2B/t value is from 0.5 to 1.5 as compared with the comparative examples 1 to 3.

Referring to FIG. 14, in the present invention, it is found that in order to set the defective rate to 20% or less (the yield of 80% or more), the value of A/t or 2B/t needs to be set to be larger than 0.1 but smaller than 3. To more securely obtain the above desired defective rate, it is found that a more preferable value is set to 0.2 or more but 2.5 or less.

Normally, when the thickness of the current collector 20 is slightly larger than the dimension (A and 2B) of the depth of the current collector receiving portion (the step portions 56a~56c and 57a~57f), the current collector serves as a packing since it is soft and crinkled to the degree that the current collector is not broken when a pressure is applied to the current collector, thereby making it hard to leak the solution. However, as the thickness of the current collector becomes gradually thicker than the dimension of the depth of the current collector receiving portion, when a pressure is applied to the current collector, a positional displacement occurs, and a sealing strength is weakened resultantly as in the conventional structure in which the gaskets made of the same material are not in contact with each other. Conversely, when the dimension (A and 2B) of the current collector receiving portion (the step portions 56a~56c and 57a~57f) is larger than the inserted current collector, the positional displacement at the time of applying the pressure is difficult to occur. However, because the current collector is in a floating state, when the pressure is conversely applied to the current collector, the current collector is caused to move within the cell, and the electrolytic solution 30 is linked between the cells with the result that a voltage per unit cell rises. Also, it is presumed that there occurs such a problem that the potential balance is lost and the reliability may decrease.

In the electrical double layer capacitor according to the present invention, defects hardly occur in the process, and the relative mean lifetime is remarkably improved. In particular, the above effect is remarkable when the current collector receiving portion (step portion) is disposed on one side of the gasket. The reason for this will now be considered.

The engaging portion of the concave and projection is disposed as in the comparative example 4 (refer to FIG. 7), but the bonding strength between different materials is not sufficient. The bonding surface of the gasket and the current collector except for the engaging portion is liable to be peeled off or cracked due to a temperature load or the like, and the crack or the peeling is extended to the engaging portion, and the electrolytic solution is leaked. On the other hand, if there is a portion in which the gaskets made of the same material are in contact with each other, for example, as in the embodiment 1 of the present invention (refer to FIG. 9), the bonding strength becomes high, and the separation is difficult to occur. Therefore, even if a crack occurs in a portion where the current collector and the gasket are in contact with each other, if no crack occurs in a portion where the gaskets are in contact with each other, it is considered that there is substantially no possibility that the electrolytic solution within the cell is leaked to the external. In fact, in the samples used here in which where the A/t value of the embodiment 1 tested is from 0.5 to 1.5, even if a crack occurs in a portion where the current collector and the gasket are in contact with each other, the crack stops there, and there is no sample in which the crack extends to a portion where the gaskets are in contact with each other.

As was described above, the electrical double layer capacitor according to the present invention is structured such that the gasket is disposed on the outer side of the outermost current collector, and the step portion for receiving the side edge portion of the current collector is disposed on the end surface of the gasket, thereby being capable of obtaining the following advantages.

(1) A crinkling or displacement when adhering the current collector to the gasket can be suppressed, and the manufacture yield of the electrical double layer capacitor, that is, the productivity can be improved.

(2) The decrease in the bonding strength of the gasket and the current collector under a high temperature can be prevented, thereby preventing the leakage of the electrolytic solution to the external from occurring, and the reliability of the electrical double layer capacitor under a high temperature can be improved.

TABLE 4

| SAMPLE | DEFECTIVE RATE (%) | RELATIVE MEAN LIFETIME |
|---|---|---|
| EMBODIMENT 1 | | |
| A/t =   0.1 | 39 | 1.4 |
|          0.5 | 2 | 10.1 |
|          1.0 | 0 | 10.3 |
|          1.5 | 2 | 10.1 |
|          3.0 | 28 | 1.7 |
| EMBODIMENT 2 | | |
| 2B/t =  0.1 | 42 | 1.2 |
|          0.5 | 2 | 9.5 |
|          1.0 | 0 | 9.8 |
|          1.5 | 8 | 9.3 |
|          3.0 | 24 | 1.5 |
| COMPARATIVE EXAMPLE 1 | 51 | 1 |
| COMPARATIVE EXAMPLE 2 | 21 | 2.4 |
| COMPARATIVE EXAMPLE 3 | 29 | 2.8 |

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An electrical double layer capacitor comprising:
   a cell member of a pair of polarized electrodes sandwiching a porous separator therebetween;
   a first gasket of a frame shape for housing said cell member therein, said first gasket having a first step portion formed in an inner peripheral upper edge portion thereof;
   a first current collector received in said first step portion, said first current collector adhered to an upper surface of said first gasket;
   a second gasket of a frame shape adhered to the upper surface of said first gasket and said first current collector, said second gasket having the same peripheral dimensions as that of said first gasket;
   a second current collector adhered to a lower surface of said first gasket, said second current collector having smaller peripheral dimensions than that of said first gasket; and a third gasket of a frame shape adhered to the lower surface of said first gasket and said second current collector, said third gasket having the same peripheral dimensions as that of said first gasket such that a side edge portion of said second current collector is received in a second step portion formed in an inner peripheral edge portion thereof.

2. The electrical double layer capacitor as claimed in claim 1, wherein said first step portion has a depth equal to a thickness of said first current collector, and said second step portion has a depth equal to a thickness of said second current collector.

3. The electrical double layer capacitor as claimed in claim 1, wherein said second gasket is provided with a third step portion in an inner peripheral edge portion thereof for partly receiving said side edge portion of said first current collector, and said first gasket is provided with a fourth step portion in an inner peripheral lower edge portion thereof for partly receiving said side edge portion of said second current collector.

4. The electrical double layer capacitor as claimed in claim 1, wherein a ratio of a depth of said first step portion to a thickness of said first current collector is 0.1 to 3.0 and a ratio of a depth of said second step portion to a thickness of said second current collector is 0.1 to 3.0.

5. The electrical double layer capacitor as claimed in claim 3, wherein a ratio of a sum of a depth of said first step portion and said third step portion to a thickness of said first current collector is 0.1 to 3 and a ratio of a sum of a depth of said second step portion and said fourth step portion to a thickness of said second current collector is 0.1 to 3.

6. The electrical double layer capacitor as claimed in claim 1, wherein the material of said first current collector and said second current collector is one of a butyl rubber sheet and a polyethylene sheet to which electrical conductivity is given.

7. The electrical double layer capacitor as claimed in claim 1, wherein the material of said polarized electrode is a block-shaped activated carbon.

8. The electrical double layer capacitor as claimed in claim 1, wherein the material of said first gasket, said second gasket and said third gasket is selected from one of butyl rubber, polyethylene resin and ABS resin.

9. The electrical double layer capacitor as claimed in claim 1, wherein an electrolytic solution is sealed within said first gasket.

10. The electrical double layer capacitor as claimed in claim 1, further comprising a second cell member accommodated within a fourth gasket having the same shape of said first gasket such that said fourth gasket is sandwiched between said first gasket and said third gasket together with a third current collector received in a third step portion formed in an inner peripheral upper edge portion thereof.

* * * * *